April 30, 1935. E. H. SIMPSON 1,999,344
VEHICLE IDENTIFICATION TAG
Filed Jan. 15, 1934
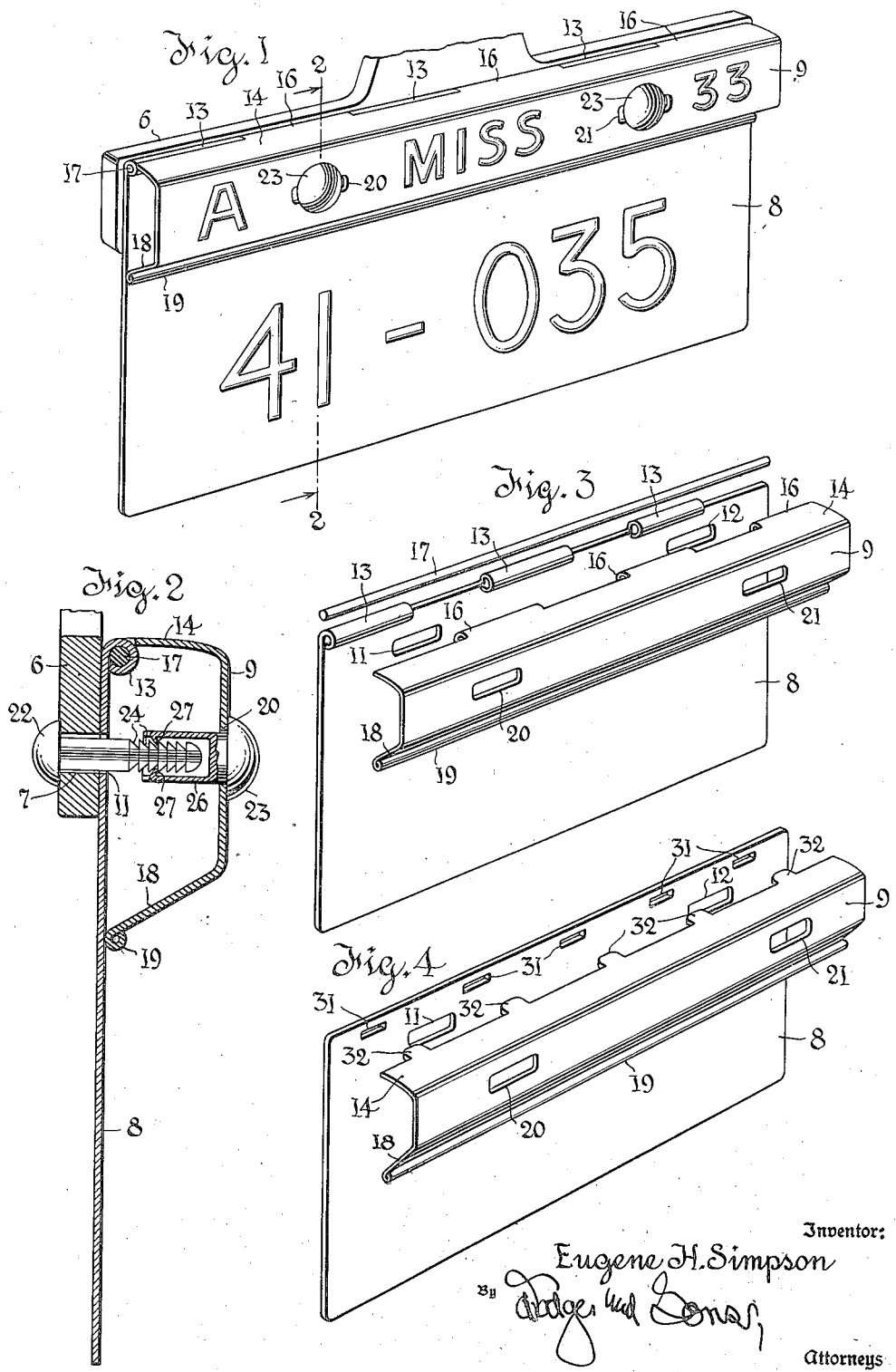
Inventor:
Eugene H. Simpson
Attorneys Patented Apr. 30, 1935

1,999,344

UNITED STATES PATENT OFFICE 1,999,344

VEHICLE IDENTIFICATION TAG

Eugene H. Simpson, Jackson, Miss.

Application January 15, 1934, Serial No. 706,723

7 Claims. (Cl. 40—125)

The present invention relates to vehicle, more particularly automobile, identification tags.

A primary purpose of the invention is to furnish a license or identification tag and permanent, lock-type fastening means therefor, whereby the tag when once secured on the vehicle to which it has been assigned may not be removed without so mutilating the tag as to render it either entirely useless or sufficiently damaged to indicate the fact that it has already been used upon a vehicle. With such an arrangement in general use, theft of automobiles would be materially reduced because of the impossibility of transferring or "switching" of tags from one vehicle to another. A further advantage to the authorities would be the consequent elimination of the illegal practice on the part of unscrupulous automobile owners of purchasing a single tag and using it on two or more automobiles or trucks.

A further object is the designing of a license tag device, comprising a main plate or identification element and a supplemental or auxiliary identification element, which is intended to be issued annually and permanently attached to the vehicle by special fastening means so as to prevent ready removal thereof as stated above. Removal of the tag, as explained, is intended to mutilate it or at least the supplemental idenification element thereof. This is done annually by the owner and the old main and supplemental elements replaced by new elements which are permanently secured in place as described. Preferably the auxiliary element carries indicia which are necessary with the indicia on the main identification element to complete the identification of the vehicle so that both elements must be used together. However, this arrangement is not essential to certain features of the invention as will appear hereinafter.

Another object is to provide adequate fastening means for readily securing the license tag firmly to its supporting bracket and the elements of the tag together so as to eliminate all possibility of looseness and resultant rattling of the parts. Other objects include designing of the license tag and the fastening means so that they are of simple construction, cheap to manufacture and may readily be mounted in place on the vehicle.

In the drawing, wherein are represented two practical embodiments of the invention:—

Fig. 1 is a perspective of the preferred form of the license tag when installed in place on the vehicle bracket;

Fig. 2 is a section on line 2—2 of Fig. 1, which shows the details of one of the tag fastening devices;

Fig. 3 is a perspective of the preferred device removed from the bracket and disassembled, the identifying indicia being omitted from the main and supplemental elements of the tag for sake of clearness; and Fig. 4 is a view similar to Fig. 3 of a modified form of the tag.

The vehicle tag supporting bracket is represented at 6. This bracket is provided with the usual bolt-receiving slots, one of which is shown at 7 in Fig. 2.

The preferred form of tag shown in Figs. 1–3 comprises a main identification element or plate 8 and a supplemental identification element 9. Plate 8 is similar in shape and size to the standard license plate and is provided near its upper edge with the usual pair of bolt-receiving slots 11, 12. Along its upper edge, main plate 8 is formed with spaced extensions which are bent to provide tubular portions or loops 13. Supplemental identification element 9, which is of resilient metal, is channel-shaped and extends entirely across the top of the main element 8. The upper flange 14 of identification element 9 projects inwardly substantially at right angles to the main or outer face of the supplemental element. As shown in Fig. 2, flange 14 is slightly bowed upwardly for a purpose explained later.

At its inner edge, flange 14 is formed, similarly to main plate 8, with spaced extensions which are bent to provide tubular portions or loops 16. These loops are spaced on identification element 9 so that, when the parts of the device are assembled as shown in Figs. 1 and 2, loops 16 fit snugly between loops 13 on the main plate 8. In this position the passages through all of the loops 13 and 16 are aligned, so that they may receive a connecting pin or pintle 17 which is driven through all of the loops to connect the edges of the two identification elements securely together. The lower flange 18 of supplemental identification element 9 inclines downwardly and inwardly toward the main plate 8. At its lower edge, flange 14 is bent to form a smooth bead 19 bearing against the main plate and adapted for free sliding movement thereon under certain conditions as will appear hereinafter.

Supplemental identification element 9 is provided with a pair of bolt-receiving slots 20, 21 which align with the corresponding slots in bracket 6 and slots 11, 12 in the main plate 8. Through these two sets of slots extends a pair of lock bolt fastening devices which serve firmly to clamp the two identification elements 8, 9 on the bracket 6. As shown most clearly in Fig. 2, each of these fastening devices comprises a bolt 22 and a headed locking member 23 having suitable pawl and ratchet connection with each other. Bolt 22 is formed at its outer end with a series of spaced annular grooves 24. The shank 26 of locking member 23 is hollow and open at its outer end to receive the grooved end of bolt 22. Spring tongues or detents 27 bent inwardly from the ends of locking member 23 engage with one of the annular grooves 24 on bolt 22 to lock the two coupling members firmly and permanently together.

In mounting the tag in place on bracket 6, after the identification elements 8 and 9 have been connected together by pin 17 as described, the tag is simply held in the position shown in Fig. 2 with the two sets of bolt holes in alignment. The bolts 22 are then slipped into the openings in bracket 6 and main plate 8 from the rear so as to support the tag on the bracket. One of the locking members 23 is then inserted in its opening in the supplemental identification element 9 from the front and telescoped into interlocking engagement with the corresponding bolt 22, as shown in Fig. 2, spring teeth 27 yielding during this operation to permit successive engagement of the teeth with the grooves 24. The other locking member 23 is then connected to its bolt in the same manner.

Each of the assembled fastening devices is then forced together as far as it will go so as to bring the heads of the fasteners into tight engagement with the bracket and the tag and thereby clamp all of these parts firmly together. During this tightening operation, supplemental identification element 9, which is adapted to bend inwardly because of its particular cross sectional form and mode of attachment to main plate 8, yields to permit shortening of the telescoping fastening members and their resultant interlocking in this shortened condition. The tension under which element 9 is thus placed, it will be seen, serves automatically to secure the members of the fastening devices, the bracket 6, and the tag elements in tight engagement with each other and to maintain them in such engagement irrespective of initial loose play between the parts or such loose play as may occur due to wear. All possible sources of "rattle" in the assembly due to vibration of the parts is thereby entirely eliminated.

As appears in Fig. 1, the main plate 8 has suitably appearing thereon the number identifying the vehicle to which the tag is applied. Preferably this number would be embossed thereon and the tag and number would be of different colors pursuant to standard practice. In the preferred system of identification of vehicles in the State or other Territory in which tags of the character proposed herein would be used, these numbers would run from 1 to the number corresponding to the combined total of pleasure and commercial vehicles in the State. The supplemental identification element 9 in this system would have appearing thereon, in a similar manner, the name of the State, the year date, and a designation such as "A", "B", "C", etc., according to the weight of the vehicle, if used on a passenger car, or a designation such as "½T", "1T", "1½T", "2T", etc., according to the capacity of the vehicle, if used on a commercial car or truck. Hence, with the system described, the presence of both the main and supplemental plates 8 and 9 is necessary for proper legal identification of the vehicle.

It is obviously impossible with the tag construction described to remove either the main license plate 8 or the supplemental plate 9 without so mutilating or disfiguring the license tag, particularly the supplemental plate 9, as to render impossible transfer of the tag to another vehicle and its use thereon without detection. Location of the spring detents 27 within the tubular shanks of the locking members 23 particularly insures against successful tampering with the fastening means at this point.

The modified form of the tag appearing in Fig. 4 is essentially the same as the preferred form above described. The only difference is in the manner of connecting the flange 14 of the supplemental identification element 9 to the upper edge of the main plate 8. In the modification this is accomplished by providing a series of spaced slots 31 along the upper edge of main plate 8 into which are adapted to project, when the two identification elements are assembled, a corresponding series of ears 32 extending from the rear edge of flange 14 of identification element 9. The tag with this type of connection would be cheaper to manufacture than if the pintle type connection of the preferred form were employed. It will be clear that it is intended that the modified tag is to be mounted on the bracket 6 and fastened thereto in the same manner and by the same means as were described with reference to the preferred construction of the device.

While several practical forms of the device have been described, obviously various changes may be made in the device without departing from the scope of the invention, except as the same may be limited by the appended claims.

What is claimed is:—

1. The combination of a supporting bracket; a main display element having certain vehicle identifying indicia thereon; a resilient, auxiliary display element also having certain indicia thereon, said bracket and said display elements having registering openings therein; and fastening means comprising separate members having adjustable pawl and ratchet connection with each other and extending through said registering openings in the bracket and the display elements, to secure said parts together, said resilient display element being held under tension by the fastening means, whereby to prevent loose play in said pawl and ratchet connection and to maintain the bracket and said display elements in firm engagement with each other.

2. The combination of a supporting bracket; a main display element having certain vehicle identifying indicia thereon; a resilient, auxiliary display element also having certain indicia thereon, said bracket and said display elements having registering openings therein; and fastening means for securing the bracket and the display elements together, said means comprising separate members extending through said registering openings in the bracket and the elements and connected together by a spring tooth on one member engaging the other member, the resilient display element being held under tension by the fastening means, whereby to prevent loose play in said connection and to maintain the bracket and the display elements in firm engagement with each other.

3. The combination of a supporting bracket; a main display element having certain vehicle identifying indicia thereon; a resilient, auxiliary display element extending across the top of the main display element and also having certain indicia thereon, said auxiliary element being channel-shaped and connected at its upper edge to the main display element, the lower edge of the auxiliary element having free sliding engagement with the main display element; and fastening means connecting the main and auxiliary display elements to the bracket.

4. The combination of claim 3 further characterized in that a series of spaced loop portions is provided on the upper edge of the auxiliary display element and a series of similar loop portions on the upper edge of the main display element and a connecting pin extends through both of said series of loops.

5. The combination of claim 3 further characterized in that the auxiliary display element which is channel-shaped is formed with spaced ears along its upper edge and the main display element is provided near its upper edge with openings corresponding to said ears and into which said ears project.

6. The combination of a supporting bracket; a display element having certain indicia thereon, one face of said element being in contact with said bracket; a plurality of fastening devices for securing the display element to the bracket at spaced points; and a resilient auxiliary display member also having certain indicia thereon and coacting with said fastening devices and the opposite face of the display element to prevent loose play between the fastening devices, the display element and the bracket and thereby maintain all of the parts in firm engagement with each other.

7. The combination of a main display element having certain vehicle identifying indicia thereon; and a resilient, auxiliary display element extending across the top of the main display element and also having certain indicia thereon, said auxiliary element being channel-shaped and connected at its upper edge to the main display element, the lower edge of the auxiliary element having free sliding engagement with the main display element, and the main and auxiliary display elements being provided with registering openings to receive fastening means whereby said display elements may be connected to a supporting bracket.

EUGENE H. SIMPSON.